United States Patent
Chilukoor et al.

(10) Patent No.: US 7,917,671 B2
(45) Date of Patent: Mar. 29, 2011

(54) SCALABLE PORT CONTROLLER ARCHITECTURE SUPPORTING DATA STREAMS OF DIFFERENT SPEEDS

(75) Inventors: Muralidharan Soundararajan Chilukoor, Bangalore (IN); Robert Chapman, Mountain View, CA (US); Mark Alan Overby, Bothell, WA (US); Suyash Ranjan, Allahabad (IN)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 11/959,450

(22) Filed: Dec. 18, 2007

(65) Prior Publication Data

US 2009/0157916 A1 Jun. 18, 2009

(51) Int. Cl.
*G06F 3/00* (2006.01)
*G06F 13/00* (2006.01)

(52) U.S. Cl. .......................................... 710/38; 710/316
(58) Field of Classification Search ................... 710/1–5, 710/11–12, 36–40, 100–104, 316–317
See application file for complete search history.

(56) References Cited

U.S. PATENT DOCUMENTS

| | | | |
|---|---|---|---|
| 4,524,440 A | 6/1985 | Orsic | |
| RE32,900 E | 4/1989 | Orsic | |
| 5,453,983 A | 9/1995 | O'Connell et al. | |
| 5,634,069 A | 5/1997 | Hicok et al. | |
| 5,703,883 A | 12/1997 | Chen | |
| 5,754,957 A | 5/1998 | Khan | |
| 5,875,190 A | 2/1999 | Law | |
| 6,005,863 A | 12/1999 | Deng et al. | |
| 6,023,732 A | 2/2000 | Moh et al. | |
| 6,088,822 A | 7/2000 | Warren | |
| 6,199,150 B1 * | 3/2001 | Yoshikawa | 711/170 |
| 6,351,725 B1 | 2/2002 | Willis et al. | |
| 6,480,488 B1 | 11/2002 | Huang | |
| 6,526,535 B1 | 2/2003 | Warren | |
| 6,715,023 B1 | 3/2004 | Abu-Lebdeh et al. | |
| 6,724,759 B1 | 4/2004 | Chang et al. | |
| 6,738,881 B1 | 5/2004 | Ollivier et al. | |
| 6,741,575 B1 | 5/2004 | Zhang et al. | |
| 6,924,953 B2 | 8/2005 | Fish et al. | |
| 7,039,771 B1 | 5/2006 | Spaur et al. | |
| 7,050,859 B1 | 5/2006 | Govindaraj et al. | |
| 7,151,893 B2 | 12/2006 | Hayashi et al. | |
| 7,421,518 B2 | 9/2008 | Toda | |
| 7,441,056 B2 * | 10/2008 | Lee | 710/62 |
| 7,457,311 B2 | 11/2008 | Hall | |
| 7,468,975 B1 | 12/2008 | Davis | |
| 2006/0187837 A1 * | 8/2006 | Warren et al. | 370/235 |
| 2006/0282567 A1 * | 12/2006 | Bhesania et al. | 710/52 |
| 2006/0288131 A1 * | 12/2006 | Lee | 710/29 |
| 2008/0320186 A1 * | 12/2008 | Lee | 710/60 |

* cited by examiner

*Primary Examiner* — Christopher B Shin

(57) ABSTRACT

A scalable port controller architecture supporting data streams of different speeds. In an embodiment, a port controller contains high speed receptor units and low speed receptor units, and a port routing logic connecting each external device (on corresponding port) to one of the receptors according to various registers. The port routing logic may connect an external device to one of the receptors, which determines the data rate at which data on a corresponding virtual connection from the external device is being received/sent. If the receptor does not have sufficient capacity (based on the data rate) to communicate with the external device, the connection is moved to other receptors, potentially in another control unit.

15 Claims, 4 Drawing Sheets ated with a port in a digital processing system. While ports provide for physical connectivity, port controllers are designed with various protocol specifications to facilitate transfer of signals (digital or analog) through port(s) (points of access) of a digital processing system. The protocols specification often include the electrical specifications (e.g., which indicates when there is a valid data transfer), data specifications (when a signal represents a specific data/bit value), and higher level aspects (e.g., flow control, packet definitions, etc.).

SCALABLE PORT CONTROLLER ARCHITECTURE SUPPORTING DATA STREAMS OF DIFFERENT SPEEDS

BACKGROUND

1. Field of Disclosure

The present disclosure relates generally to port controllers, and more specifically to scalable port controller architecture supporting data streams of different speeds.

2. Related Art

A port refers to a physical location/component provided on a digital processing system for interfacing with external devices. Ports are often provided as one of a socket/receptacle and a plug, with the interfacing external device using the other one of the socket and the plug, such that the connection path between the two can be physically secured during communication. However, alternative physical structures forming a port can also be used to secure the physical communication path between the digital processing system and the external device.

A port controller is often provided associated with a port in a digital processing system. While ports provide for physical connectivity, port controllers are designed with various protocol specifications to facilitate transfer of signals (digital or analog) through port(s) (points of access) of a digital processing system. The protocols specification often include the electrical specifications (e.g., which indicates when there is a valid data transfer), data specifications (when a signal represents a specific data/bit value), and higher level aspects (e.g., flow control, packet definitions, etc.).

Port controllers often receive data streams from external devices via the corresponding ports. A data stream refers to a sequence of values (e.g., bits or bytes) sent by the external device consistent with the various interface specification.

The data streams may be of different speeds, which may depend upon one or more of factors such as the speed supported by the external device, bandwidth available on a path between the external device and the port controller, the number of streams (and their aggregate rate capacity) being supported by a port controller simultaneously, etc.

It is generally desirable to have a scalable port controller architecture, designed to support data streams of different speeds.

BRIEF DESCRIPTION OF THE DRAWINGS

Example embodiments will be described with reference to the following accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A port controller provided according to an aspect of the present invention provides enhanced support for data streams of different speeds. In an embodiment, a port controller contains high speed receptor units and low speed receptor units, and a port routing logic connecting each external device (on corresponding port) to one of the receptors according to various registers.

The port routing logic may connect an external device to one of the receptors, which determines the data rate at which data on a corresponding virtual connection from the external device is being received. If the receptor does not have sufficient capacity (based on the data rate) to communicate with the external device, the connection is moved to other receptors, potentially in another control unit.

According to another aspect of the present invention, a device driver is designed to control the connection of each external device to a desired receptor based on the availability of additional capacity in the receptor to support connections with a data rate equaling the connection from the external device. The device driver may set the values in various registers, which control the selection by multiplexors, to obtain a desired connection.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

2. Example System

Figure 1:
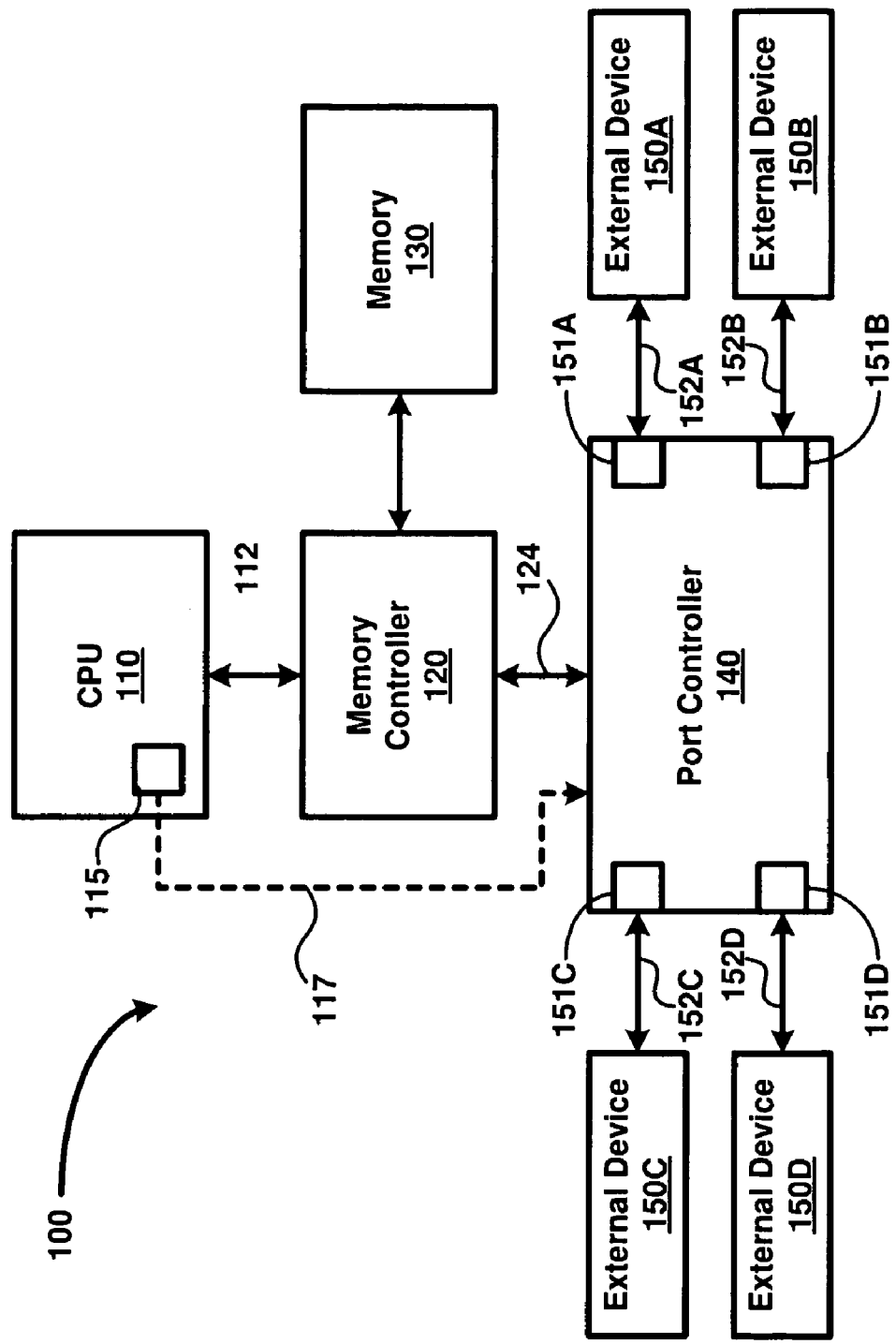
FIG. 1 is a block diagram of an example environment in which several aspects of the present invention may be implemented.

FIG. 1 is a block diagram of an example system in which several aspects of the present invention may be implemented. Digital processing system 100 is shown containing CPU (Central Processing Unit) 110, device driver 115, memory controller 120, memory 130, port controller 140 with ports 151a-151d, and external devices 150a-150d. Each component of FIG. 1 is described in detail below.

The block diagram is shown containing only representative blocks/components for illustration. However, real-world systems may contain more/fewer/different components/blocks, both in number and type, depending on the purpose for which the system is designed, as will be apparent to one skilled in the relevant arts. For example, a typical digital processing system may contain more components such as a display, removable storage, network interface(s), etc., but are not shown as not being relevant to an understanding of the following description.

Memory 130 contains randomly accessible locations to store programs (instructions) and/or data, which are used by CPU 110 during operation of digital processing system 100. In general, CPU 110 executes the retrieved instructions while using some of the stored data elements as parameter values. The data retrieved may correspond to various configuration data (used to indicate the parameters of a device connected to a port such as device address, device speed, etc.). Memory 130 may contain volatile memory (e.g. SRAM, SDRAM, DDR RAM, etc.), non-volatile memory (e.g. ROM, EEPROM, Flash Memory, etc.) or both.

Memory controller 120 controls the transfer (in both directions) of data between each of the pairs formed from CPU 110, memory 130 and port controller 140, as well as transfer of instructions between CPU 110 and memory 130. Memory controller 120 provides the physical paths such as data bus, address bus, control bus, etc., and the control signals required for the transfer of data and instructions. In an embodiment implemented in the context of Intel Architecture, memory controller 120 is implemented as a 'North Bridge' controller.

External devices 150A-150D represent devices/peripherals which communicate with digital processing system 100 through respective ports 151A-151D over respective ones of communication paths 152A-152D. Devices 150A-150D may exchange digital values representing information such as parameters, data, control signals, etc., with digital processing system 100, using protocols and electrical specifications such as RS232, ATA (Advanced Technology Attachment), PCI (Peripheral Component Interconnect), USB (Universal Serial Bus), etc. Even though shown as a solid line, it should be appreciated that a part of the communication path from an external device can be based on wireless protocols.

Once parameters such as data rate, etc., are established, a virtual channel may be established to transfer a corresponding data stream. Different data streams may be sent on different virtual channels from the same external device. In USB compliant environments, a device is usually associated with a device address. In addition, each device could contain several end points, with each end point permitting a corresponding virtual channel, on which a sequence of packets can be transferred. The end point number and the device address may uniquely identify the virtual channel (pipe). For further details on USB, the reader is referred to corresponding standards (e.g., "Universal Serial Bus Revision 2.0 specification" available from various sources).

In general, each virtual channel (and thus the corresponding data stream) is between two specific end points (e.g., an application of an external device and an application executing within digital processing system 100). Each virtual channel (and thus data stream) may be setup with a corresponding data rate based on communication prior to transferring data elements forming the stream. It should be appreciated that the data streams can be in either direction, i.e., from digital processing system 100 to an external device, or vice versa.

CPU 110 at least in some respects controls the operation (or non operation) of the various other blocks (in digital processing system 100) by executing instructions stored in memory 130. In general, CPU 110 reads a sequence of instructions from various types of memory medium such as memory 130 and executes the instructions to provide several features of the present invention.

Device driver 115 represents a sequence of instructions executed by CPU 110 to control the operations of port controller 140 (as indicated by path 117) and ports 151A-151D in facilitating external devices 150A-150D connected to ports 151A-151D to communicate with various applications executing in digital processing system 100. In general, the device driver software is shared by various applications executing in digital processing system 100 to communicate with the external devices.

In an embodiment described below, device driver 115 enables controller hub to provide a scalable architecture in interfacing with various external devices transferring data streams at different speeds. However, the corresponding control logic can be provided in other components (e.g., within port controller 140, in the form of one or more of hardware, firmware, software, etc.) itself, as will be apparent to one skilled in the relevant arts by reading the disclosure provided herein.

Ports 151A-151D, shown located within port controller 140, provide for securing the physical communication path with external devices. As noted in the background section above, each port can be implemented using one of various well-known physical structures to secure the physical communication path with digital processing system 100. Merely for simplicity, each port is shown securing/receiving the communication path from a single external device. However, the same communication path can be shared by multiple external devices (for example through an USB Hub incase of USB), without departing from the scope and spirit of several aspects of the present invention.

Port controller 140, under the control of sequence of instructions executed by CPU 110, controls the operation of ports 151A-151D to provide connectivity between external devices 150A-150D and various applications executing in digital processing system 100. Port controller 140 provides the relevant protocol support necessary for the communication. Port controller 140 may contain a number of individual controllers, which are together operated according to several aspects of the present invention to provide the desired scalable architecture, as described below with examples.

3. Port Controller

Figure 2:
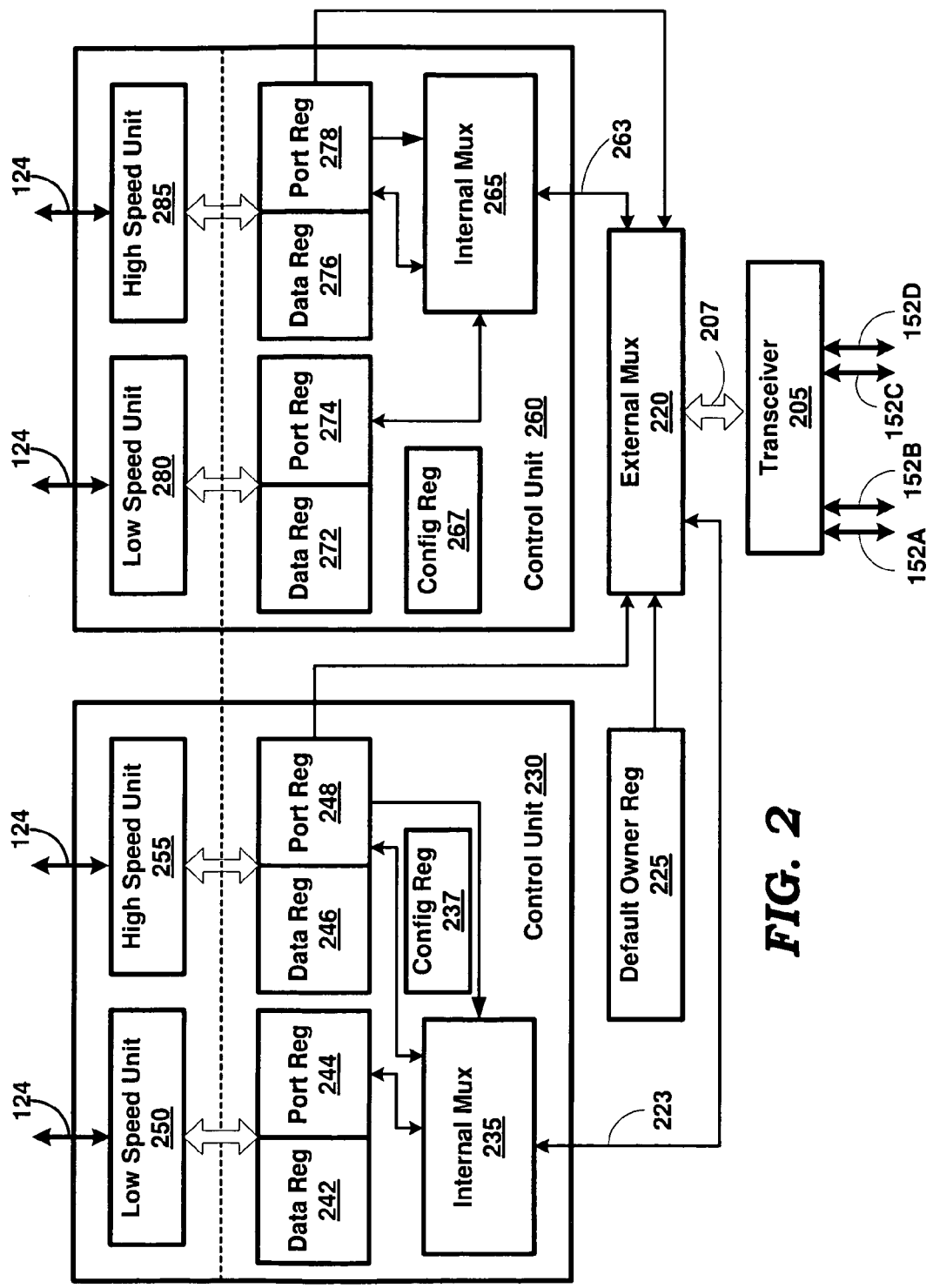
FIG. 2 is a block diagram of a scalable port controller supporting data streams of different speeds, implementing several aspects of the present invention in an embodiment.

FIG. 2 is a block diagram illustrating the details of portions of port controller 140 in an embodiment of the present invention. Port controller 140 is shown containing control units 230 and 260, default owner register 225, external mux 220 and transceiver 205. Each block is described below in further detail. Merely for illustration, Port Controller 140 is shown to have only two control units. However, alternative embodiments can contain more units, without departing from the scope and spirit of several aspects of the present invention.

It should be appreciated that the portions of port controller depicted in FIG. 2 contains two identical units 230 and 260, with the internal components having identical functionality, though the two units are operated differently with respect to each other. The description below is provided primarily with respect to control unit 230 merely for conciseness, though the description is applicable to control unit 260 as well.

The block diagram is shown containing only representative blocks for illustration. However, real-world environments may contain more/fewer/different components/blocks, both in number and type, depending on the purpose for which the port controller is designed, as will be apparent to one skilled in the relevant arts. For example, though only one low speed unit 250 and one high speed unit 255 are shown in each control unit, port controller 140 may contain a number of other interfaces for enabling external devices using different protocols and electrical specifications to communicate with digital processing system 100. Similarly, in an embodiment, each control unit contains multiple low speed units (and only a single high speed unit) though only a single low speed unit is shown for conciseness.

Transceiver 205 provides the physical and electrical interfaces necessary for data transfer between port controller 140 and external devices 150A-150D. Though not shown in FIG. 2, ports 151A-151D would be provided within transceiver 205. Transceiver 205 may be implemented in a known manner.

Default owner register 225 stores values corresponding to each port 151A-151D, indicating the specific one (default control unit) of control units 230 and control unit 260, which controls the data transfer between external devices connected to ports 151A-151D and a target application (via the appropriate memory/register locations), in a default condition (e.g., switching on, reboot, disconnection of an external device connected to the respective port, etc.). The value stored in default owner register 225 may control external mux 220 to route data through control unit 230 over path 223 or through control unit 260 over path 263 for each of the ports. Device driver 115 may set the values in default owner register 225 at the time of switching on/reboot, etc.

Control units 230 and 260 represent identical control units providing connectivity between external devices 150A-150D connected to ports 151A-151D respectively, and respective target applications (via the appropriate memory/register locations). Control unit 230 (260) is shown containing low speed unit 250 (280), high speed unit 255 (285), config register 237 (267), data registers 242 and 246 (272 and 276), port registers 244 and 248 (274 and 278) and internal mux 235 (265). At least with respect to current USB specifications in which a bandwidth of 480 Megabits maximum speed and a lower speed (upper limit) of 12 Mbit./sec, one high speed unit and potentially several low speed units may be contained in each control unit. Each component block is described below.

It should be appreciated that the protocols/electrical specifications associated with low speed unit 250 and high speed unit 255 may be different. It should also be understood that the terms high (or higher) and low (lower) indicate relative speeds at which the corresponding external devices interface (transmit/receive data), and can take on different values consistent with the stated logical relationship depending on the specific environment in which the various aspects of the invention are deployed.

Low speed unit 250 represents a controller which provides the functions such as protocol support, enumeration (querying a connected external device and obtaining parameters, configuration values, etc.), etc., necessary for data transfer between the target application and external devices 150A-150D connected to respective ports 151A-151D, at lower speeds. Low speed unit 250 receives/sends data from/to an external device through data register 242 and a target application over path 124. In the description below, only the high speed units are described as performing enumeration type set up activities, even though alternative embodiments can be implemented with the lower speed units (receptors) performing enumeration.

Similarly, high speed unit 255 provides the functions such as protocol support, enumeration, etc., necessary for data transfer between the target application and external devices 150A-150D connected to respective ports 151A-151D at higher speeds. High speed unit 255 receives/sends data from/to an external device through data register 246 and a target application over path 124. Each of the high speed units and the low speed units is referred to as a receptor as these are the units that process the data streams received from (or sent to) the external devices.

In an embodiment, control unit 230 represents a USB host controller, low speed unit 250 represents an Open Host Controller Interface (OHCI)/Universal Host Controller Interface (UHCI) which may support data transfer at speeds up to 12 Mbps (Mega bits per second) and high speed unit 255 represents Enhanced Host Controller Interface (EHCI) which may support data transfer at speeds up to 480 Mbps. Each of the receptors may be implemented with a DMA controller which facilitates data storage into memory 130 once a DMA command is issued by device driver 115 via memory controller 120. Each DMA controller may be implemented with the corresponding interfacing standards.

Low speed unit 150 and high speed unit 255 may pass on to device driver 115, status information pertaining to external devices 150A-150D connected to ports 151A-151D such as device parameters (device connection/disconnection, speed of data transfer, etc.), status of data transfers, etc. Device driver 115 may use the information received from low speed unit 250 and high speed unit 255 to write appropriate values in port register 248, to control the operation of internal mux 235 (to select high speed unit 250 or low speed unit 255) and to control the operation of external mux 220 (to select control unit 230 or control unit 260), as described above.

Data register 242 represents a temporary storage for data (data buffer) for data being transferred using low speed unit 250, before being transferred to the destination (a target application via the appropriate memory/register locations, or external devices connected to ports 151A-151D depending on the direction of data transfer). Similarly, data register 246 represents a temporary storage for data being transferred using high speed unit 255 (in either direction).

Config (configuration) register 237 stores configuration values indicating the control units of port controller 140, which may be paired, and thus only one register may be present in each control unit. Pairing refers to two control units together forming a pair such that a port may be connected to one control unit (default control unit) of the pair or the other control unit (alternate control unit), as described below.

For example, if config register 237 holds a value zero, control unit 230 may not be paired with any other control unit. For all other values in config register 237, control unit 230 may be paired with another control unit of port controller 140 whose config register holds the same value. For example, if config register 237 holds a value "one" and config register 267 also holds a value "one", control unit 230 may be paired with control unit 260. For description below, it is assumed that both config registers 237 and 267 are set (by user configuration via device driver 115) to the same non-zero value.

Port register 244 stores values representing parameters relating to the status and control of ports 151A-151B, associated with low speed unit 250. In an embodiment, port register 244 represents the PORTSC (port status and control register) of Open Host Controller Interface (OHCI)/Universal Host Controller Interface (UHCI) of Universal Serial Bus specifications (available from www.usb.org).

Port register 248 stores two values for each of ports 151A-151D, controlling the operation of internal mux 235 and external mux 220 respectively. Port registers 244 and 248 are per port registers which implies that there is a separate set of port registers 244 and 248 associated with each port controlled by port controller 140. Each port register may be implemented as a separate configurable register, or alternatively a single register with sufficient numbers of bits can be used to control communication with all ports.

Continuing with reference to FIG. 2, internal mux 235 represents a multiplexer which routes data transfer over path 233 to data register 242 or data register 246, under the control of port register 248. Internal mux 235 thus selects low speed unit 250 or high speed unit 255 for the data transfers between external device 150A connected to port 151A and the target application.

External mux 220 represents a multiplexer which routes data transfer from path 207 to either control unit 230 (over path 223) or to control unit 260 over path 263, for each of the ports 150A-150D. In the default condition (as listed above), the respective bit in default owner register 225 controls external mux 220, as described above. Thereafter, bit 306 in port register 248 (of the default control unit in a pair of control units) controls external mux 220, as described above.

Thus, config registers (237, 267), corresponding port registers (248, 278 respectively) and the default owner register 225 together control the selection between control units 230 and 260 and within control unit 230 to select between low speed unit (250, 280) and high speed unit (255, 285). Accordingly, the registers and other control logic (device driver 115 in the illustrative example here) facilitating the selection may be viewed as a port routing logic. The port routing logic enables connection of a port 151A-151D to control unit 230 or control unit 260 (belonging to a pair), and in the connected control unit, to the low speed unit (250/280) or the high speed unit (255/285).

In the default condition ((switching on, reboot, disconnection of a device connected to the respective port, etc.), a port 151A-151D may be connected to the default control unit as decided by respective value in default owner register 225, described above. Device driver 115 may change bit 306 in port register (248,278) to change the control unit (230,260). Device driver 115 may also change bit 305 in port register (248,278) to select between low speed unit (250,280) and high speed unit (255,285).

The details of the config register, port register and default owner register in an embodiment is depicted in the next section.

4. Example Registers

Figure 3A:
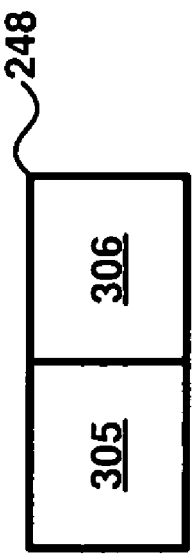
FIG. 3 depicts register values of a scalable port controller according to an embodiment of the present invention.
Figure 3B:
Figure 3C:
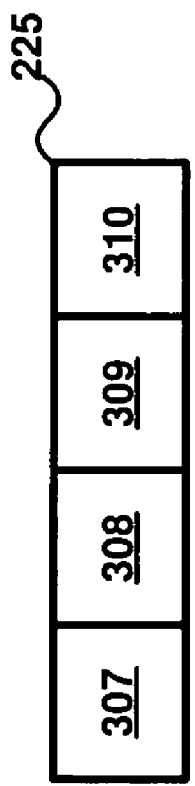

FIGS. 3A-3C depict the details of an example config register, port register and default owner register in an embodiment of the present invention. It should be appreciated that only some of the relevant entries/details of registers, as relevant to the description herein, is shown/described for conciseness. However, various other details may also be stored in the registers, as will be apparent to one skilled in the relevant arts by reading the disclosure provided herein.

FIG. 3A depicts config register 237 in an embodiment of the present invention. Config register 237 is shown having two bits 301 and 302. With two bits 301 and 302, there as 4 possible values, as shown in table 310 (FIG. 3D). If the value is zero (row 311), control unit 230 cannot be paired with any other control unit. If the value is 1 (row 312), control unit 230 may be paired with other control units having value 1 (i.e., same value) in the config register, and similar pairing may be done for other values.

FIG. 3B depicts port register 248 in an embodiment of the present invention. Port register 248 is shown having two bits, 305 and 306. Bit 305 controls the operation of internal mux 235 and bit 306 controls the operation of external mux 220. For example, when bit 305 has a value "0", internal mux 235 may connect path 223 to high speed unit 255. When bit 305 has a value "1", internal mux 235 may connect path 223 to low speed unit 250. Similarly, when bit 306 has a value "0", external mux 220 may connect path 207 to control unit 230. When bit 306 has a value "1", external mux 220 may connect path 207 to control unit 260.

It should be appreciated that bit 306 is active (used or effective) only if control unit 230 is the default control unit of a pair of control units (as described above). If control unit 230 is not part of a pair, or if control unit 230 is not the default control unit in a pair, changing the value of bit 306 has no effect on external mux 220.

FIG. 3C depicts the contents of the default port owner register 225, in an embodiment of the present invention. Default port owner register 225 is shown having four bits 307-310, corresponding to four ports 151A-151D. If bit 307-310 is "0", the default owner may be control unit 230 and if bit 308 is "1", the default owner may be control unit 260.

As described above, the device driver may control the content of various registers described above to cause a suitable receptor to process a stream of data (on a virtual channel) from/to an external device. The operation of the device driver in an embodiment is described below in further detail.

5. Supporting Data Streams of Differing Speeds

Figure 4:
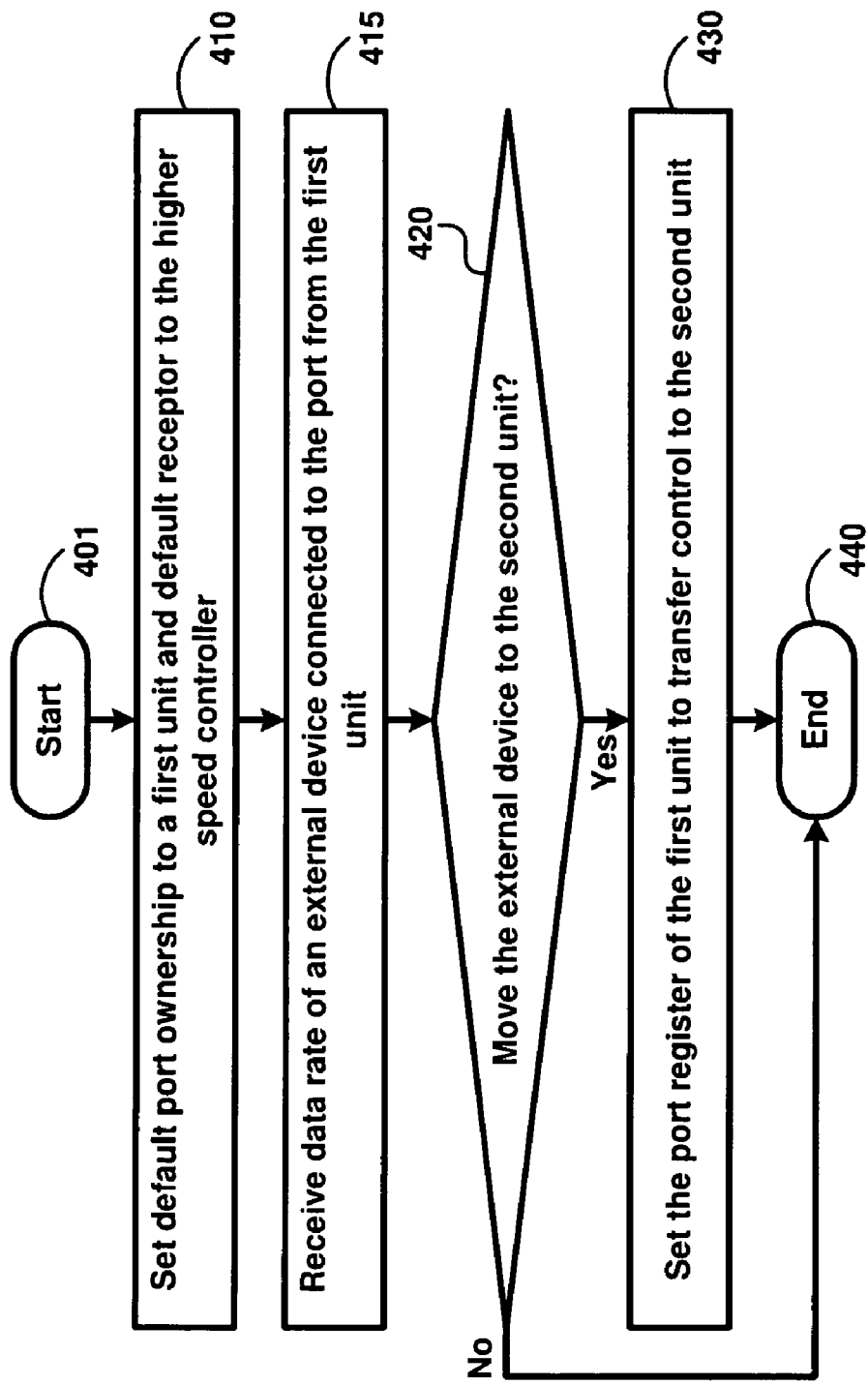
FIG. 4 is a flowchart illustrating the manner in which a device driver may support data streams of differing speeds according to an aspect of the present invention.

FIG. 4 is a flowchart illustrating the manner in which data streams of differing speeds may be supported in an embodiment of the present invention. The flowchart is described with respect to FIGS. 1-3 merely for illustration. However, various features can be implemented in other environments and other components. Furthermore, the steps are described in a specific sequence merely for illustration.

Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 401, in which control passes immediately to step 410.

In step 410, device driver 115 sets default port ownership to a first control unit and default receptor to the higher speed unit (255/285) since the higher speed units are generally designed to perform enumeration type investigative activities. The default owners and receptors may be set according to any pre-specified criteria and is generally set by designers of the system or administrators using the system 100. The description is continued assuming that the default ownership of the port is set to control unit 230.

In step 415, device driver 115 determines data rate of an external device connected to the port from the first control unit. When an external device is connected to the port, control unit 230 may query the connected external device (the process of enumeration) as noted above and receive parameters, including the data rate the device endpoints are designed to operate at, associated with the device. Control unit 230 may pass the information about the data rate of the external device endpoints to device driver 115. For example, if an external device 150B with a endpoint requirement of 480 Mbps is connected to port 151B, device driver 115 receives this information from control unit 230.

In step 420, device driver 115 makes a determination of whether to move the external device to the second paired control unit. Device driver 115 checks whether the first control unit (control unit 230) has adequate capacity to handle the data transfer of the external device. If there are devices already connected to the first control unit (control unit 230), device driver 115 may compute the total data rate already handled by control unit 230 and the available capacity. For example, if control unit 230 has a maximum capacity of 480 Mbps and an external device 150A with a device speed of 480 Mbps is already connected to port 151A, control unit 230 has no spare capacity.

Hence, if an external device 150B with a device speed of 480 Mbps is connected to port 151B, device driver 115 determines that external device 150B is to be moved to the second control unit 260, as first control unit 230 has no spare capacity. If device driver 115 determines that the external device is to be moved to the second control unit, control passes to step 430. Otherwise, control passes to step 440.

In step 430, device driver 115 sets the port register of the first control unit to transfer control to the second control unit. For example, bit 306 in port register 248 corresponding to the port may be used to transfer control to first unit 230 (when bit is "0") or second control unit 260 (when bit is "1"), as described above. Device driver 115 may also determine a suitable one of the receptors 280 and 285 to process the data stream, and set port register 274/278 accordingly. The bits are set, for example at the end of a discovery phase (when enumeration is complete) before data transfer (i.e., that delivered to applications) starts.

In an embodiment, when the device is moved from one port to the other, enumeration is performed again by the receptor to which the port is connected. Such enumeration may be forced by a causing a protocol disconnect and reconnect (virtual session to be closed from the previous connector and again opened with the new receptor), according to the appropriate signaling protocol. The flow chart ends in step 440.

Thus by transferring control to a second control unit, when device driver 115 determines that the first control unit cannot handle the data transfer for an external device, data streams of differing speeds associated with different external devices may be supported. The description is continued with the description of operation of port controller 140 in an embodiment of the present invention.

6. Example Operation

The operation of port controller 140 in an embodiment of the present invention is described below for illustration. The operation is described with respect to FIGS. 1-4, merely for illustration. It may be appreciated that there may be a number of other ways of operation for the port controller, as will be apparent to one skilled in the relevant arts, by reading the disclosure provided herein.

The operation is described, making the following assumptions. Each port 151A-151D may transfer data at up to 480 Mbps. External device 150A and 150 B are high speed devices, capable of data transfer speeds of up to 480 Mbps. External device 150C is a low speed device capable of data transfer speed of up to 12 Mbps.

On initialization (switching on, i.e. applying power, reboot, etc.), device driver 115 writes (stores) values into config registers 237/267, default owner register 225 and each of port registers 248/278 corresponding to ports 151A-151D. Device driver stores the same value (other than "0") in config registers 237 and 267 (to indicate that control units 230 and 260 may be paired) and sets bits 307-310 of default owner register 225 to "0" (indicating that control unit 230 is the default control unit and by implication, control unit 260 becomes the alternate or backup control unit for ports 151A-151D).

Device driver 115 also sets bits 305 and 306 of port registers 248 and 278 corresponding to each of ports 151A-151D (a total of 4 port registers 248 and four port registers 278 corresponding to one port register 248 and one port register 278 each for each of four ports 151A-151D) to "0". Setting bit 305 to "0" selects high speed unit 255 of control unit 230 and high speed unit 285 of control unit 260, for data transfers (by causing internal mux 235 and 265 to data registers 246 and 276 respectively). However, since control unit 230 is the default control unit, control unit 260 (hence high speed unit 285) may not be used for any data transfer (till device driver 115 selects alternate control unit 260). Setting bit 306 (of control unit 230) to "0" causes external mux 220 to couple path 207 to path 223. The bit 306 of control unit 260 has no effect since default owner register 225 indicates that control unit 230 is the default control unit.

When external device 150A is connected to port 151A, high speed unit 255 (high speed unit of the default control unit i.e. control unit 230) receives various parameters corresponding to external device 150A, such as the device speed for external device 150A (device speed refers to the maximum speed at which a device endpoint may receive or send data, which is 480 Mbps for external device 150A), during the process of enumeration. High speed unit 255 passes the device endpoint speed information to device driver 115. Since no other device is connected to high speed unit 255 of default control unit 230, device driver 115 determines that high speed unit 255 may handle the data transfer for external device 150A.

As device 150A is already connected to high speed unit 255, device driver 115 does not change the configuration of port controller 140. Device driver 115 may store in memory 130 information indicating that a high rate connection is being served by high speed unit 255. Memory 130 may be updated (by device driver 115) with the specific external devices/virtual connections and the respective data rates, presently being served by different receptors.

Next, external device 150B may be connected to port 151B. High speed unit 255, during the process of enumeration similar to that for external device 150A described above, receives the device endpoint speed for external device 150B as 480 Mbps and passes on this information to device driver 115. As high speed unit 255 is already handling data transfer for external device 150A at its full capacity of 480 Mbps, device driver 115 determines that high speed unit 255 has no spare capacity to handle data transfer for external device 150B and hence the high speed unit of the alternate control unit (high speed unit 285) may be used to handle data transfer for external device 150B

Accordingly, device driver 115 writes a value "1" into bit 306 of port register 248 corresponding to port 151B (causing external mux 220 corresponding to port 151B to connect path 207 to path 263) to select alternate control unit 260 for data transfers of external device 150B connected to port 151B. As bit 305 of port register 278 corresponding to port 151B is already set to "0" at initialization, high speed unit 285 is used for data transfers for external device 150B connected to port 151B.

When external device 150C is connected to port 151C, high speed unit 255, during the process of enumeration similar to that for external devices 150A-150B described above, receives the device speed for external device 150C as 12 Mbps and passes on this information to device driver 115. Device driver 115 determines that low speed unit 250 (having the ability to support low speed devices, with device speeds of up to 12 Mbps) may handle data transfer for external device 150C. Device driver 115 writes a value "1" into bit 305 of port register 248 corresponding to port 151C (causing internal mux 235 corresponding to port 151C to connect path 223 to data register 242) to select low speed unit 250 to handle data transfers for external device 150C.

When external device 150C is disconnected from port 151C, low speed unit 250 detects the device disconnection and passes the disconnection event to device driver 115. Device driver 115 writes a "0" into bit 305 of port register 248 corresponding to port 151C (causing internal mux 235 corresponding to port 151C to connect path 223 to data register 246), thus resetting bit 305 to the default value.

When external device 150B is disconnected from port 151B, high speed unit 285 detects the device disconnection and passes the device disconnection event to device driver 115. Device driver 115 writes a "0" into bit 306 of port register 248 corresponding to port 151B (causing external mux 220 corresponding to port 151B to connect path 207 to path 223) to connect port 151B to default control unit 230.

On disconnecting external device 150A from port 151A, high speed unit 255 detects the device disconnection and passes the device disconnection event to device driver 115. As the bits 305-306 are already "0", the default value, device driver 115 does not change them.

As another example, it is assumed that high speed unit 255 is presently handling connections having a total aggregate bandwidth of 240 Mbps and external device 150B is now connected, requesting a connection of 260 Mbps. As high speed unit 255 (as well as other receptors in control unit 230) cannot handle the new connection, device driver 115 may determine to move the new connection to high speed unit 285.

Accordingly, device driver 115 may cause the connection to be disconnected, change the values of the registers such that packets thereafter are received by high speed unit 285 (as described above), and establish the connection again with the same end point in external device 150B. As a part of the connection re-establishment, enumeration may be performed again using high speed unit 285.

It may be appreciated that when an external device is connected to a port, device driver 115 checks to see if the default control unit can handle the data transfer for the device. If the default control unit cannot handle the data transfer because of capacity constraints, and if the default control unit is part of a pair, device driver 115 switches to the alternate control unit for handling transfer of data for the external device, by writing appropriate values in the corresponding port register. When the external device is disconnected, device driver 115 writes appropriate values in the corresponding port register of the corresponding port in port controller 140 to default state.

7. CONCLUSION

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A port controller for providing connectivity to external devices, said port controller comprising:
   a first low speed unit and a second low speed unit operable to communicate with an external device at a low data rate;
   a first high speed unit and a second high speed unit operable to communicate with an external device at a high data rate;
   a port operable to be connected to an external device employing a physical communication path; and
   port routing logic operable to make a connection between said external device and one of said first low speed unit and said first high speed unit, wherein the connected unit determines a communication rate of said external device and wherein said port routing logic is further operable to determine whether said connected unit has sufficient capacity to communicate with said external device, and
   wherein further said port routing logic operable to make a connection between said external device and one of said second low speed unit and said second high speed unit provided neither said first low speed unit and said first high speed unit has sufficient capacity to communicate with said external device.

2. The port controller of claim 1, wherein said first low speed unit and said first high speed unit are parts of a first control unit, and said second low speed unit and said second high speed unit are parts of a second control unit.

3. The port controller of claim 2, wherein said port is within a device and wherein further said device comprises a plurality of ports including said port and wherein further said port routing logic comprises:
   a default owner register operable to store a respective first value indicating whether said first control unit or said second control unit is a default control unit for each of said plurality of ports, wherein said first value related to said port indicates that said first control unit is said default control unit;
   a first port register in said first control unit operable to store a respective second value indicating whether a corresponding one of said plurality of ports is to be connected to said first low speed unit or said first high speed unit, wherein said second value related to said port also indicates whether said external device is to be connected to said first control unit or said second control unit;
   an external multiplexer operable to couple said external device to said first control unit or said second control unit according to said first value in said default owner register and said second value in said first port register; and
   a first internal multiplexer in said first control unit operable to couple said external device to either said first high speed device or said first low speed device according to said second value in said first port register.

4. The port controller of claim 3, wherein said port routing logic further comprises a device driver which is operable to set and reset values in said first port register and said default owner register to control connection of said external device to a desired one of said low speed units and said high speed units.

5. The port controller of claim 4, wherein said port routing logic further comprises a configuration register for storing a third value which indicates whether connections from said port can be moved from said first control unit to said second control unit and
   wherein said device driver is operable to change value in said first port register to move a connection from said first control unit to said second control unit provided said third value indicates that connections from said port are moveable from said second control unit.

6. The port controller of claim 5, wherein said device driver is operable to reset said second value in said first port register when said external device is removed from said port, wherein resetting said second value causes said external multiplexer to connect new connections from said port to be connected to said default control unit.

7. The port controller of claim 5, wherein said first high speed unit is implemented to transfer data related to external devices implemented according to a standard substantially compliant with USB 2.0 and said first low speed unit is implemented to transfer data related to external devices implemented according to a standard substantially compliant with USB 1.1.

8. A device for communicating with a plurality of external devices, said device comprising:
   a memory storing a plurality of instructions and data;
   a processor executing said plurality of instructions using said data;
   a port controller communicatively coupled to said processor, said port controller comprising a plurality of control units including a first control unit and a second control unit, said first control unit comprising a receptor having a limit on an aggregate rate of connections served by said receptor; and port routing logic operable to make a connection between an external device and said first control unit and further operable to determine a communication rate of said external device, said port routing logic further operable to determine whether said limit is exceeded if said external device is connected to said receptor and said port routing logic operable to move a connection from said first control unit to said second control unit provided said limit is so exceeded.

9. The device of claim 8, further comprising a plurality of ports and wherein said port routing logic comprises:
  a default owner register operable to store a respective first value indicating whether said first control unit or said second control unit is a default control unit for each of said plurality of ports, wherein said first value related to said port indicates that said first control unit is said default control unit;
  a first port register in said first control unit operable to store a respective second value indicating whether a corresponding one of said plurality of ports is to be connected to said first control unit or said second control unit; and
  an external multiplexer operable to couple said external device to one of said first control unit and said second control unit according to said first value in said default owner register and said second value in said first port register.

10. The device of claim 9, wherein said port routing logic further comprises a device driver which is operable to set and reset values in said first port register and said default owner register to control connection of said external device to a desired one of said first control unit and said second control unit.

11. The device of claim 10, wherein said port routing logic further comprises a configuration register for storing a third value which indicates whether connections from said port can be moved from said first control unit to said second control unit, wherein said device driver is operable to change value in said first port register to move a connection from said first control unit to said second control unit provided said third value indicates that connections from said port are moveable to said second control unit.

12. The device of claim 11, wherein said device driver is operable to reset said second value in said first port register when said external device is removed from said port, wherein resetting said second value causes said external multiplexer to connect new connections from said port to be connected to said default control unit.

13. The device of claim 9, wherein said receptor in said first control unit is implemented to transfer data related to external devices implemented according to a standard substantially compliant with USB 2.0.

14. A method of providing communication between an external device and a suitable receptor, said method being performed in a port controller having a plurality of ports, said method comprising:
  initiating a connection between said external device and a first receptor in a first control unit;
  ascertaining a rate at which said external device is to communicate;
  checking whether said first control unit has sufficient capacity to communicate with said external device based on said rate; and
  initiating a connection between said external device and a second control unit if said ascertaining determines that said first control unit does not have sufficient capacity to communicate with said external device.

15. The method as described in claim 14 wherein said first control unit and said second control unit are separate units in said port controller.

* * * * *